United States Patent [19]

Tukude

[11] Patent Number: 4,702,566

[45] Date of Patent: Oct. 27, 1987

[54] ELECTROCHROMIC DISPLAY DEVICE

[75] Inventor: Noboru Tukude, Yokohama, Japan

[73] Assignee: Asahi Glass Company Ltd., Tokyo, Japan

[21] Appl. No.: 719,452

[22] Filed: Apr. 3, 1985

[30] Foreign Application Priority Data

Apr. 12, 1984 [JP] Japan .................................. 59-71844

[51] Int. Cl.⁴ ............................................... G02F 1/01
[52] U.S. Cl. .................................... 350/357; 350/336
[58] Field of Search ........ 350/336, 344, 357, 362–363, 350/334, 339 R, 335; 368/239; 340/785

[56] References Cited

U.S. PATENT DOCUMENTS

| 3,978,580 | 9/1976 | Leupp et al. | 350/344 |
| 4,150,878 | 4/1979 | Barzilai et al. | 350/344 |
| 4,235,525 | 11/1980 | Berman et al. | 350/339 R |
| 4,315,668 | 2/1982 | Aftergut et al. | 350/344 |
| 4,344,674 | 8/1982 | Giglia | 350/357 |

FOREIGN PATENT DOCUMENTS

| 2441895 | 6/1980 | France . | |
| 102897 | 8/1979 | Japan | 350/357 |
| 143093 | 11/1979 | Japan | 350/334 |
| 12624 | 2/1981 | Japan | 350/357 |
| 90618 | 5/1983 | Japan | 350/357 |
| 618034 | 6/1980 | Switzerland . | |
| 618282 | 7/1980 | Switzerland . | |
| 622928 | 5/1981 | Switzerland . | |
| 1523075 | 8/1978 | United Kingdom | 350/357 |

OTHER PUBLICATIONS

Gladstone et al. "Liquid Crystal Display Device Configuration", IBM Tech. Disc. Bull., 7-1972, pp. 437–438.

Primary Examiner—William H. Punter
Attorney, Agent, or Firm—Oblon, Fisher, Spivak, McClelland & Maier

[57] ABSTRACT

An electrochromic display device is disclosed which utilizes a display substrate having a transparent substrate and a display electrode formed on the substrate which is to be displayed by an electrochromic material. A counter substrate is provided with a counter electrode which faces the display electrode and is spaced therefrom. An electrolyte is provided in the space between the display electrode and the counter electrode. The device is structured such that the counter substrate has through-holes as well as a conductive material which extends through each of the through-holes and is in direct contact with a transparent electrode on the display substrate so that the transparent electrode of the substrate is conductively connected to the electrode on the rear side of the counter substrate.

7 Claims, 6 Drawing Figures

ELECTROCHROMIC DISPLAY DEVICE

BACKGROUND OF THE INVENTION

1. Field of the Invention

The present invention relates to an electrochromic display device (hereinafter referred to simply as "ECD") having many display segments. More particularly, the present invention relates to ECD having a number of display segments in the form of dots.

2. Discussion of Background

ECD has merits such as excellent memory characteristics and good contrast in the display, and accordingly has been desired to be employed for various display devices. However, as compared with a liquid crystal display device (hereinafter referred to simply as "LCD"), a great electric current flows instantaneously at the time of driving, and it is necessary to minimize the resistance of the leads connected to the respective segments. As opposed to LCD, multiplexing drive is not applicable, and it is required to form one lead for every segment. Accordingly, if the number of segments is increased, the pattern design becomes difficult, and the leads are obliged to be slender and be put around for a increased lead length, whereby the resistance increases, and the response speed of ECD tends to decrease.

On the other hand, in ECD, LCD, etc., it has been known to form leads by lamination of electro conductive layers, or to lead out the segments through through-holes to the rear side of a substrate. However, the lamination of electro conductive layers leads to poor productivity, and is hardly applicable particularly in the case where a number of segments are to be provided as in the case of a dot matrix display. In the case of providing through-holes, an electrode formed on one side of a substrate is led out through the substrate to the other side of the substrate. Such a method is not useful for ECD, since it is not practical to lead out a display electrode formed on the rear side of a display substrate through the substrate to the front side of the substrate.

SUMMARY OF THE INVENTION

It is an object of the present invention to overcome such drawbacks of the conventional electrochromic display devices.

The present invention provides an electrochromic display device which comprises:
 a display substrate comprising a transparent substrate and a display electrode formed on the substrate for display by an electrochromic material;
 a counter substrate provided with a counter electrode facing said display electrode with a space therefrom; and
 an electrolyte in the space between the display electrode and the counter electrode,
  wherein the counter substrate is provided with through-holes, and a conductive material extends through each through-hole and is in direct contact with a transparent electrode of the display substrate so that the transparent electrode cf the display substrate is conductively connected to an electrode (conductor) on the rear side of the counter substrate.

According to the present invention, the transparent electrode of the display substrate is led out to the rear side of the facing counter substrate, whereby even if the segments are increased in number, the leading out can readily be made without leading to a drawback of the reduction of the effective display area due to an extended patterning of lead or without an increase of the resistance. Thus, the response speed will not be decreased.

BRIEF DESCRIPTION OF THE DRAWING

Now, the present invention will be described in further detail with reference to the accompanying drawings.

DETAILED DESCRIPTION OF THE PREFERRED EMBODIMENTS

Figure 1:
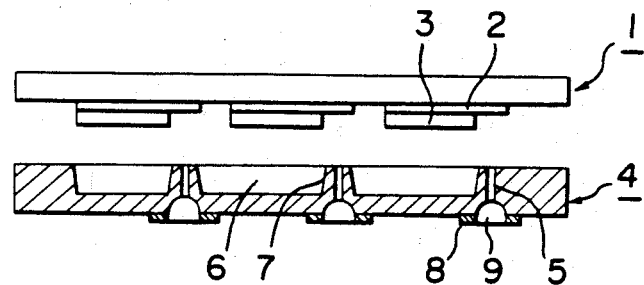
FIG. 1 is a cross-sectional view of a typical embodiment of the present invention illustrating a display substrate and a counter substrate prior to the assembling.

Referring to FIG. 1, a display substrate 1 comprises a transaprent substrte; a transparent electrode 2 constituting a display electrode formed on the substrate, and a layer 3 of an electrochromic (EC) material such as $WO_3$ formed on the electrode in a desired pattern.

The transparent substrate may be any substrate made of a transparent material such as glass or plastic material and which may contain an ultraviolet absorber or a coloring agent, or which may be provided with an ultraviolet absorbing layer, a colored layer, a non-glare coating layer, a masking layer for non-display portions, a print layer of characters or designs, or a layer of an inorganic or organic substance to prevent the alkali elution or to prevent the see-through of the electrode pattern. The transparent electrode may be a transparent electrode made of e.g. $In_2O_3$ or $SnO_2$. It is usual to employ a colorless transparent electrode. However, in some cases, a colored transparent electrode may be used.

The electrochromic material may be any substance which reversibly undergoes a color change or can be colored or uncolored (erased) by an application of an electric voltage, such as a transition metal compound, e.g. tungsten oxide, molybdenum oxide or iridium oxide, a viologen compound, or a rare earth metal-diphthalocyanine compound complex. The electrochromic material may be formed into a layer on the transparent electrode or may be dispersed in the electrolyte. In the present invention, it is preferred to form a transition metal compound in the form of a layer on the transparent electrode.

In the case of the layer structure, the electrochromic material is formed on the transparent electrode in a desired pattern to form a segment. As such a pattern, there may be mentioned a 7-segments numerical pattern (letter 8-form), a small dot pattern such as a circle or square as in the case of dot matrix, as shown in later discussed FIG. 3 a designed pattern, or a bar graph pattern. In the case of the dispersion in the electrolyte, the display will be determined by the pattern of the transparent electrode, and any unnecessary portion i.e.

a non-display portion may be over-coated with an insulating material.

In the present invention, the pattern of the transparent electrode is formed larger at least partially than the display pattern so that the transparent electrode is connected to the through-hole of the counter substrate.

Further, it is common to form a layer of a background material on the EC material layer 3 of the display substrate so as to prevent the after-mentioned counter electrode from being seen from the front side. This background material may be any material so long as it is a porous material such as $Al_2O_3$ or a fluorine-containing resin which permits the permeation of the ions required to color or uncolor the EC material. It may be a plate-like preformed material or may be formed in the form of a layer on the EC material layer by printing, so long as it is capable of covering the portion beneath the background material.

Figure 2:
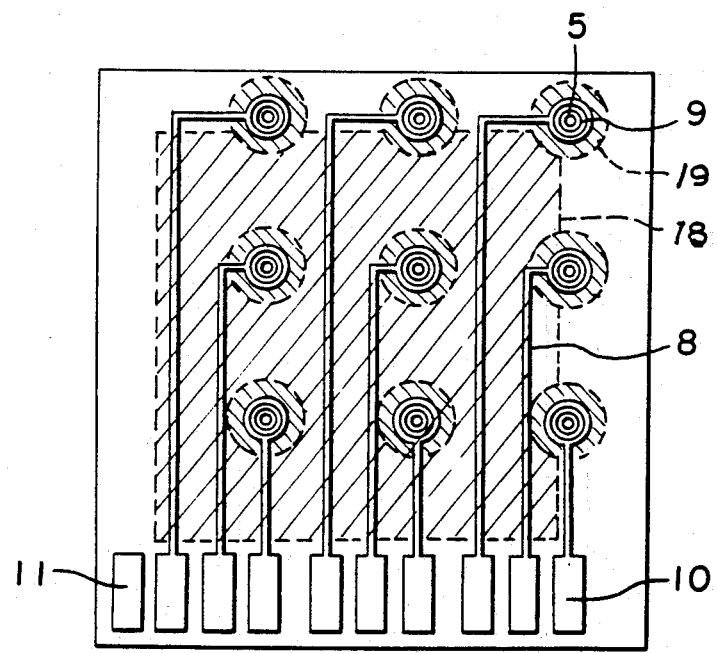
FIG. 2 is a bottom view showing the rear side of the counter substrate of the present invention.
Figure 5:
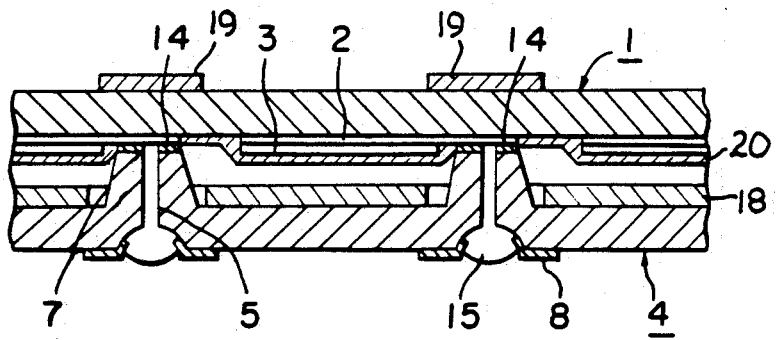
FIG. 5 is a partial enlarged cross-sectional view of an embodiment of the present invention after the assembling.

The counter substrate 4 has a counter electrode 18 as shown in FIGS. 2 and 5 made of e.g. $MnO_2$-carbon or $WO_x$-carbon. When combined with the display substrate 1, the counter substrate 4 permits the disposition of the electrolyte in the space between it and the display substrate. Through-holes 5 are provided on the counter substrate so that the transparent electrodes of the display substrate can be conductively connected through the through-holes 5 to the conductor 8 on the rear side of the counter substrate. The counter substrate 4 may be a substrate made of e.g. glass, plastics, ceramics or metals, and may be opaque.

In the case where the electrolyte is solid, no sealing material for the peripheral portion may be required. When the electrolyte is liquid, it is necessary to seal the periphery with a sealing material to form a space in which the electrolyte may be filled. In the embodiment illustrated in FIG. 1, the counter substrate is provided with a recess 6 by a suitable method such as etching, press molding or sand blasting, and protrusions 7 with the through-holes. In addition, a preformed spacer may be sandwiched between the display substrate and the counter substrate, so long as the electrolyte can be filled in the space. However, as shown in FIG. 1, it is preferred to form a recess in a relatively thick substrate so that the thickness of the sealing material may be thin, and the reliability and the production efficiency will be high.

On the rear side of the through-holes 5, conductors 8 are provided for external connection. By filling a conductive material in the through-holes, transparent electrodes 2 and conductors 8 are conductively connected. The size of the through-holes may vary depending upon the size of the segments or the processing precision. However, the through-holes usually have a diameter of from 0.2 to 2 mm and a length of from 0.5 to 3 mm which corresponds to the thickness of the counter substrate, which is determined by e.g. the thickness of the electrolyte layer and the strength of the counter substrate.

In the embodiment of FIG. 1, the through-holes 5 are slightly enlarged at the rear side of the board to form recesses 9. The recesses 9 are provided to facilitate the operation of filling a conductive material into the through-holes. For instance, in the case where a conductive material is to be filled in the through-holes after the display substrate and the counter substrate are sealed, the conductive material may be injected into the recesses 9 and the through-holes by means of e.g. an injector. The through-holes are relatively narrow, and it is likely that the air remains in the through-holes in the form of air bubbles, whereby a conduction failure is likely to be led. Therefore, after the injection, the ECD cell is placed in a reduced pressure container, and vacuumed to remove the air bubbles, and then returned to atmospheric pressure, whereby the conductive material is sucked into the through-holes, and the reliability of the conductive connection is improved.

The conductive material to be filled in the through-holes may be a paste comprising conductive particles such as silver, copper or carbon particles, and a binder. Otherwise, it may be a metal having a low melting point, such as a solder.

The conductive material may be filled in the through-holes prior to the assembling of the ECD cell. For this purpose, for instance, a paste for forming a conductor is supplied from one side of the through-holes while aspirating from the other side under reduced pressure, whereby the paste is cured to form a film of a conductor on the inner walls of the through-holes. At the time of assembling, a non-cured conductive material is applied to the forward ends of the through-holes to connect the transparent electrodes of the display substrate with the conductors on the inner walls of the through-holes.

FIG. 2 is a bottom view illustrating the rear side of the counter substrate of FIG. 1, and shows a through-hole 5, a recess 9, a conductor 8 and external lead out terminals 10 and 11. The conductor may extend from the periphery of the recess 9 to the external lead out terminal 10, as illustrated by this embodiment, or it may constitute a circuit board whereby a circuit element such as an integrated circuit (IC) is mounted on the rear side of the counter substrate. In particular, at the portion of the recess 9, it is preferred that the conductor is formed to have an annular shape or a generally annular shape along the periphery of the recess 9, whereby the reliability of the connection is ensured. The material for this conductor may be the same material as the above-mentioned conductive material. It may be a metal material such as a copper foil. Further, if necessary, soldering treatment, nickel plating treatment, or the like may be applied to its surface. The terminal 11 is a terminal connected to the counter electrode 18, although such connection is not shown in the drawing.

Thus, the display substrate 1 and the counter substrate 4 are connected, if necessary, with a sealing material, to form a cell.

As the sealing material, there may be mentioned such materials as glass frits (solder glass), fluorinated resins, epoxy resins or silicone resins, which may be cured e.g. by heating, by radiation with ultraviolet rays or by mixing two liquids.

Further, it is preferred to apply the sealing material in an annular shape at the top of each protrusion 7 for secure bonding, whereby the conductive material in the through-hole is prevented from being in direct contact with the electrolyte. Further, since the substrate is bonded thereto, even when exposed to a high temperature and the electrolyte undergoes a volume expansion, the conductive connection is hardly disconnected, whereby high reliability is ensured.

To the cell thus sealed, a conductive material is injected through the through-holes and filled therein to establish the conductive connection, and an electrolyte is filled through an inlet not shown and then the inlet is sealed.

In the case where a counter substrate wherein a conductor is preliminarily formed on the inner walls of the through-holes and a non-cured conductor is applied to the forward ends of the through-holes, is employed, the conductive connection may be established at the same time as the curing of the sealing material.

The electrolyte may contain an EC material in itself or it may be capable of coloring and uncoloring (erasing) the EC material or permitting the EC material to undergo a color change. The electrolyte may be liquid, gel or solid. In the case of a solid electrolyte, a sealing material is not necessarily required. As typical examples, there may be mentioned an electrolyte prepared by dissolving a supporting electrolyte such as lithium perchlorate in an organic solvent such as propylene carbonate or $\gamma$-butylolactone. Further, a gel-type electrolyte in which e.g. polyvinyl butyral is dissolved, or a film-type electrolyte prepared by impregnating an electrolyte in a porous film, may also be employed.

In the case where the electrolyte is liquid, it may be injected from an inlet provided in the cell. The interior of the cell may be divided into a plurality of sections, and a plurality of inlets may be provided. The inlets may be formed at the side surface of the cell or at the rear surface of the cell. In the case where the electrolyte is solid, the solid electrolyte may be laminated on the display substrate or the counter substrate prior to the assembling into a cell.

Figure 3:
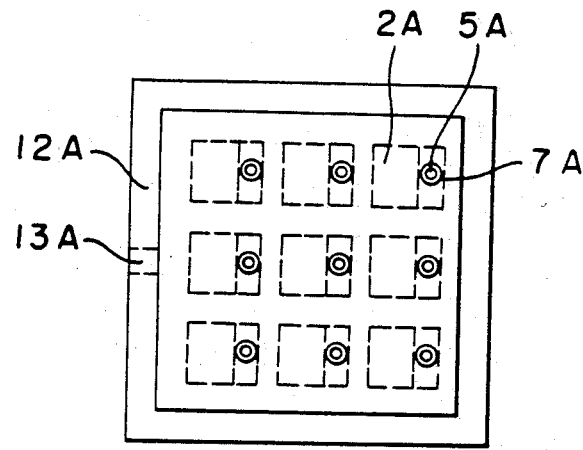
FIG. 3 is a plan view of an embodiment of the present invention.
Figure 4:
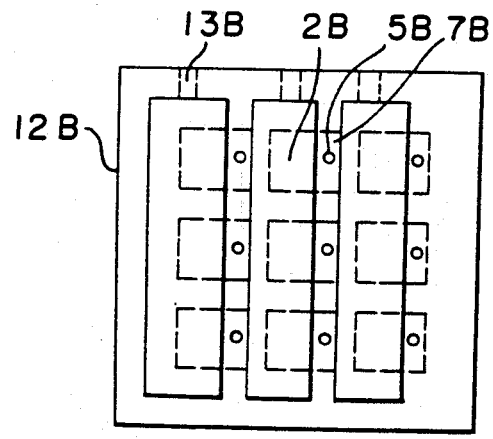
FIG. 4 is a plan view of another embodiment of the present invention.

FIGS. 3 and 4 are front views of ECD of the present invention. FIG. 3 illustrates an embodiment wherein the protrusions 7A are formed in the shape of a cylinder, whereas FIG. 4 illustrates an embodiment wherein the protrusions 7B are formed in the shape of a strip. In each case, the protrusions are provided with through-holes 5A or 5B and connected to the transparent electrodes 2A or 2B as shown by dotted lines. Further, an inlet 13A or inlets 13B are provided along the peripheral sealing portion 12A or 12B, and shown by dotted lines. In the embodiment of FIG. 4, the protrusions are in the form of a strip, and a plurality of inlets corresponding to the number of divided chambers are required. In this embodiment, three inlets are provided.

According to the present invention, a number of electrodes can be taken out without dividing the interior of the cell as shown by the embodiment of FIG. 3, and in such a case, only one inlet will be sufficient. However, as shown in FIG. 4, it is also possible to provide a dividing wall in the interior of the cell to provide separate chambers for different electrodes, thereby substantially reducing the through-holes, or a plurality of segments may be connected into a single unit for multiplexing drive.

FIG. 5 is a cross-sectional view of a part of the assembled cell of the present invention, wherein the display substrate 1 and the counter substrate 4 are sealed along their periphery, and bonded also by the sealing material 14 provided in an annular form at the top of each protrusion 7 with a through-hole 5, and an electrolyte is filled in the interior of the cell. In the through-holes 5, a conductive material 15 is filled to connect the transparent electrodes 2 on the display substrate with the conductors 8 on the rear side of the counter substrate.

By bonding the top portions of the protrusions with the sealing material, even when the electrolyte undergoes a volume expansion as the temperature rises, disconnection of the conductive connection hardly takes place, and even when particles such as silver particles are used as the conductive material, no adverse effects to the EC material will be brought about, since the conductive material is not brought in contact with the electrolyte, whereby the reliability of ECD is improved.

In the foregoing description, the basic construction of the present invention has been described. However, there may be various modifications such that a porous plate made of $Al_2O_3$ or a fluorinated resin may be inserted between the display substrate and the counter substrate for use as a background plate, or a background plate and a counter electrode may be overlaid on the display electrode.

Further, on non-display portions on the outer surface or inner surface of the display substrate, there may be provided letters, designs or maskings, such as 19 shown in FIG. 5, by printing or vapour deposition. In particular, the display quality may be improved by providing an opaque masking on the non-display portion to cover the portion other than the display electrode so that e.g. the through-holes will not be seen. Namely, by providing an opaque masking 19 on the outer surface corresponding to the non-display portion by e.g. printing, the through-holes, etc. behind it can be made invisible. In particular, by providing a masking having substantially the same color as the uncolored (erased) display portion, the through-hole portions visible blackish can be turned to be visible whitish whereby the apparent whiteness improves, and the color of the colored segments can be clearly seen with an improved contrast.

ECD of the present invention may be used for e.g. a dot matrix, a bar graph, a character or design display or a 7-segments numerical display. It is particularly effective when used for a dot matrix having a great number of segments, for example, $7 \times 5$ dots or $9 \times 13$ dots.

Further, the present invention is also suitable for a large size ECD wherein, for instance, a single character is displayed by a single ECD, and a word or sentence is displayed by a combination of a plurality of ECDs.

Now, the present invention will be described in further detail with reference to Examples. However, it should be understood that the present invention is by no means restricted to these specific Examples.

EXAMPLE 1

Figure 6:
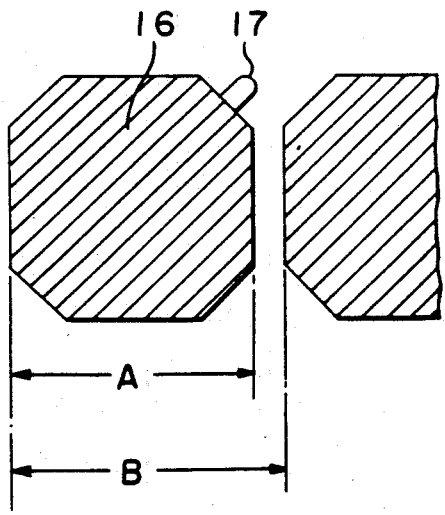
FIG. 6 is a partial plan view of the display substrate according to the Examples of the present invention.

The basic construction was as shown in FIG. 1, and the display electrode pattern was as shown in FIG. 6.

The display substrate was prepared by vapour-depositing a ITO ($In_2O_3$- $SnO_2$) transparent electrode onto a glass substrate of 120 mm $\times$ 120 mm in a thickness 1400 Å (about 35 $\Omega/\square$), then etching it to form a pattern 17 (including a pattern 16) of Fig. 6, and then vapour-depositing $WO_3$ thereon in an octagonal shape as shown by hatching 16 in FIG. 6 in a thickness of 5000 Å, to form $8 \times 8$ dots with a dot width A = 13.5 mm and a dot pitch B = 14.5 mm. Then, a resin containing $TiO_2$ pigment was printed thereon, whereby a porous white background resin plate was formed thereon.

The counter substrate was prepared from a glass plate of the same size by etching it to a depth of 0.8 mm to form a recess and protrusions in correspondence with the above-mentioned dots, and sand-blasting it to form through-holes having a diameter of about 0.5 mm and with slightly larger recesses at the rear side of the substrate. $W_{18}O_{49}$, $V_6O_{13}$ and carbon were used as a counter electrode. Further, a lead pattern as shown in FIG. 2 was formed with a conductive material paste containing silver particles on the rear side of the counter substrate. The counter electrode was also conductively connected through two through-holes to the rear side of the counter substrate.

The display substrate and the counter substrate thus prepared, were heat-sealed along the peripheral sealing portion and at the top portions of the protrusions, with an epoxy-type sealing material. A conductive material paste containing silver particles was injected to the through-holes by means of an injector needle; then the assembly was placed in a reduced pressure container and subjected to a reduced pressure to remove air bubbles from the through-holes; and the pressure was returned to atmospheric pressure, whereby the conductive material paste was filled in the through-holes. The paste was then cured and conductively connected to the transparent electrode 17. By virtue of the recesses in the through-holes, scattering of the conductive material paste at the time of the removal of the air bubbles was prevented during the vacuuming operation, whereby reliable conductive connection was established.

Then, propylene carbonate in which lithium perchlorate was dissolved, was injected through an inlet, and the inlet was then sealed.

The ECD cell thus obtained had a resistance of about 1Ω from the through-hole to the terminal, and the time required to obtain a coloring of 6 mC/cm² at 1.5 V was from 800 to 1500 msec. If the transparent electrode (about 35 Ω/□) of the above display substrate were taken out as a lead, the resistance would be as high as about 350Ω with a length of 10 cm, and the response speed would be at least 10 times. Thus, it is evident that the example of this invention is superior for a large size ECD having a number of segments.

EXAMPLE 2

The basic construction was as shown in FIG. 1, and the display electrode pattern was as shown in FIG. 6.

The display substrate was prepared by vapour-depositing a ITO(In$_2$O$_3$- SnO$_2$) transparent electrode onto a glass substrate of 150 mm × 120 mm in a thickness of 1400 Å (about 35 Ω/□), then etching it to form a pattern 17 (including a pattern 16) of FIG. 6, and then vapour-depositing WO$_3$ thereon in an octagonal shape as shown by hatching 16 in FIG. 6 in a thickness of 5000 Å, to form 15 × 16 dots with a dot width A=6.8 mm and a dot pitch B=7.2 mm. Then, a resin containing TiO$_2$ pigment was printed thereon, whereby a porous white background resin plate was formed thereon.

The counter substrate was prepared from a glass plate of the same size by etching it to a depth of 0.3 mm to form a recess and protrusions in correspondence with the above-mentioned dots, and sand-blasting it to form through-holes having a diameter of 0.5 mm. Then, from the protrusion side, a conductive material paste containing silver particles was printed by means of a screen printing plate having an aperture with a diameter of 0.9 mm, and at the same time, aspiration was applied from the rear side to suck the conductive material paste into the through-holes and apply the paste onto the inner walls of the through-holes. Then, drying was conducted at 80° C. for 10 minutes, and a lead pattern as shown in FIG. 3 was printed on the rear side of the counter substrate with the same conductive material paste. The temperature was raised to 530° C. to fix the pattern.

Then, the protrusions were masked in an annular shape, and vapour deposition was conducted to form an undercoating for a counter electrode, and at the same time to form annular electrodes on the top portions of protrusions. The resistance from the annular electrode on the top portion of the protrusion to the terminal was about 1 Ω.

As a counter electrode, W$_{18}$O$_{49}$, V$_6$O$_{13}$ and carbon were formed into a sheet, and holes were provided to avoid the contact with the protrusions. The counter electrode was conductively connected to the undercoat electrode, and the undercoat electrode was conductively connected through two through-holes to the rear side of the counter substrate.

The display substrate and the counter substrate thus prepared, were heat-sealed along the peripheral sealing portion and at the top portions of the protrusions, with an epoxy-type sealing material.

Then, propylene carbonate in which lithium perchlorate was dissolved, was injected through an inlet, and then the inlet was sealed.

The ECD cell thus obtained, had a resistance of about 1 Ω from the through-hole to the terminal, and the time required to obtain a coloring of 6 mC/cm² at 1.5 V was from 500 to 1000 msec thus exhibiting excellent characteristics.

Further, with respect to a through-hole which failed in the electric conduction whereby a part of dots didn't light up (colored), the electric conduction was readily recovered by injecting an epoxy-type conductive paste by a manual operation into the space in the through-hole. Thus, the yield was improved.

Thus, it is evident that this embodiment of the present invention is superior in the operation efficiency as well as the display characteristics for a large size ECD having a number of segments.

EXAMPLES 3 and 4

A masking was formed on the outer surface of each of the ECD cells of Examples 1 and 2 at portions corresponding to the through-hole portions. This masking was formed by printing an ink composition prepared by mixing white, black and green inks for glass in a weight ratio of 300:1:1, respectively and drying the printed ink composition, whereby the masking had a color substantially the same as the color of the uncolored (erased) display portion.

With these ECD cells, no substantial distinction was observed between the masking portions and other portions when observed from a distance, and whiteness was predominant over the entire surface, whereby the contrast with the colored dots was extremely good.

Thus, in ECD of the present invention, the display electrode is conductively connected through the through-holes to the rear side of the counter substrate, whereby the lead resistance can be minimized and a reliable electric conduction can be established, and a high response speed is obtainable for ECD having a number of segments. The present invention is useful for various applications.

I claim:

1. An electrochromic display device which comprises:
    a display substrate comprising a transparent substrate and a display electrode formed on the substrate for display by an electrochromic material;
    a counter substrate provided with a counter electrode facing said display electrode with a space therefrom; and
    an electrolyte in the space between the display electrode and the counter electrode,
    wherein the counter substrate is provided with through-holes, and a conductive material extends through each through-hole and is in direct contact with a transparent electrode of the display substrate so that the transparent electrode of the display substrate is conductively connected to an electrode on the rear side of the counter substrate, wherein the counter substrate has a recess to receive the electrolyte and protrusions, with said through-holes, are formed in the recess, and the top of each protrusion is conductively connected to the transparent electrode of the display substrate.

2. The electrochromic display device according to claim 1, wherein an annular sealing portion is formed at the top of each protrusion.

3. The electrochromic display device according to claim 1, wherein a masking is formed on the outer surface of the display substrate at portions corresponding to the through-holes, to cover therebehind.

4. The electrochromic display device according to claim 3, wherein the color of the masking is substantially the same as the color of an uncolored display portion.

5. The electrochromic display device according to claim 1, wherein the display electrode comprises said transparent electrode formed on a transparent substrate and an electrochromic material layer formed on the transparent electrode.

6. The electrochromic display device according to claim 1, wherein said counter electrode is formed on said counter substrate.

7. The electrochromic display device according to claim 1, wherein has a dot matrix pattern.

* * * * *